United States Patent
Bergeron et al.

(10) Patent No.: US 8,078,036 B2
(45) Date of Patent: Dec. 13, 2011

(54) CUSTOM CONTENT COMPILATION USING DIGITAL CHAPTER MARKS

(75) Inventors: Michael A. Bergeron, Richmond, VA (US); Yuko Nishikawa, La Jolla, CA (US); Nga Marie Phan Nguyen, Carlsbad, CA (US); Ronaldo Diaz, San Diego, CA (US)

(73) Assignees: Sony Corporation, Tokyo (JP); Sony Electronics, Inc., Park Ridge, NJ (US)

( * ) Notice: Subject to any disclaimer, the term of this patent is extended or adjusted under 35 U.S.C. 154(b) by 1492 days.

(21) Appl. No.: 11/508,153

(22) Filed: Aug. 23, 2006

(65) Prior Publication Data

US 2008/0127268 A1    May 29, 2008

(51) Int. Cl.
*H04N 5/93* (2006.01)
(52) U.S. Cl. ...................................... 386/278
(58) Field of Classification Search .............. 386/46, 386/52, 55, 67, 68, 83, 124–126, 278, 282, 386/290
See application file for complete search history.

(56) References Cited

U.S. PATENT DOCUMENTS

| | | | | |
|---|---|---|---|---|
| 5,796,945 A * | 8/1998 | Tarabella | ....................... | 709/219 |
| 6,792,617 B2 * | 9/2004 | Gorbatov et al. | ............ | 725/110 |
| 7,457,517 B2 * | 11/2008 | Godtland et al. | ............ | 386/278 |
| 2002/0199193 A1 * | 12/2002 | Gogoi et al. | ..................... | 725/46 |
| 2003/0093790 A1 * | 5/2003 | Logan et al. | .................... | 725/38 |
| 2003/0163816 A1 * | 8/2003 | Gutta et al. | ..................... | 725/46 |
| 2004/0052505 A1 * | 3/2004 | Ahmad et al. | .................. | 386/69 |
| 2006/0235550 A1 * | 10/2006 | Csicsatka et al. | .............. | 700/94 |
| 2007/0081789 A1 * | 4/2007 | Winick et al. | .................. | 386/95 |
| 2007/0154169 A1 * | 7/2007 | Cordray et al. | ................ | 386/83 |

OTHER PUBLICATIONS

Tanebaum, "structured Computer Organization" pp. 10-12, 1984.*

* cited by examiner

*Primary Examiner* — David Harvey
(74) *Attorney, Agent, or Firm* — Rader, Fishman & Grauer PLLC

(57) ABSTRACT

Digital marks are used to define segments that are sequenced in a custom content compilation that provides a virtual program. A system is configured to receive definitions of digital marks that locate segments within program content. The segments are scenes or other portions of programs that constitute less than the entirety of the program content. A series of digital marks are associated as being within a content compilation sequence. Playback of the virtual program entails sequential output of the segments corresponding to the digital marks. Alternative content includes user photos, video clips and audio clips. The virtual program may also be automatically built through access to user profile or related information.

12 Claims, 7 Drawing Sheets

CUSTOM CONTENT COMPILATION USING DIGITAL CHAPTER MARKS

BACKGROUND OF THE INVENTION

1. Field of the Invention

This invention relates generally to digital content, and more particularly to custom content compilation using digital marks.

2. Description of the Related Art

As more and more content is stored and managed by users, techniques for organizing and management the enjoyment of that content have developed.

It is known to collect user preference information and to use that information to determine whether programming should be captured and retained for later enjoyment. Programs selected in this fashion may also be arranged in a virtual channel. However, these techniques treat entire programs as the smallest unit of content. Programs in the virtual channel are by default initiated at scheduled times and are regularly deleted after their scheduled viewing. Also, these virtual channels are assembled from content to be recorded in the future as opposed to content already recorded. This places limitations on how the programs in the virtual channel can be scheduled. This also limits the ability of the user to truly customize the channel as he or she must choose the schedule before he or she has viewed the content. Additionally, these techniques fail to recognize that more than program content may be stored on a given system. The user may also store photos and other multimedia information, in addition to broadcast program content.

Other systems seek to simulate the traditional broadcast channel paradigm with recorded content, creating virtual channels to which recoded content is mapped. Again, these systems merely take entire programs and assemble them in a fashion thought to be desired by a user. These systems do not allow users to select and sequence particular scenes within such programs. Thus, while they may offer suggestions to users, they do not offer much customization or flexibility to the user.

Conventional systems also allow users to bookmark content. These bookmarks allow a user to return to a particular spot in a program. Bookmarked content is not assembled and sequenced according to user input or expectations.

It is also known to index content for abbreviated playback. However, this is typically an indexing of a single program, such as a sporting event. These systems do not offer the ability to compile content from various different sources of content into a customized virtual program.

While various useful content compilation and navigation techniques have been developed, there is a need for better management of the various program and custom content that may be stored and managed by users.

SUMMARY OF THE INVENTION

The present invention provides custom content compilation using digital chapter marks.

Digital marks are used to define segments that are sequenced in a custom content compilation that provides a virtual program. A system is configured to receive definitions of digital marks that locate segments within program content. The segments are scenes or other portions of programs that constitute less than the entirety of the program content. A series of digital marks are associated as being within a content compilation sequence. Playback of the virtual program entails sequential output of the segments corresponding to the digital marks. Alternative content includes user photos, video clips and audio clips. The virtual program may also be automatically built through access to user profile or related information.

The present invention can be embodied in various forms, including business processes, computer implemented methods, computer program products, computer systems and networks, user interfaces, application programming interfaces, and the like.

BRIEF DESCRIPTION OF THE DRAWINGS

These and other more detailed and specific features of the present invention are more fully disclosed in the following specification, reference being had to the accompanying drawings, in which.

DETAILED DESCRIPTION OF THE INVENTION

In the following description, for purposes of explanation, numerous details are set forth, such as flowcharts and system configurations, in order to provide an understanding of one or more embodiments of the present invention. However, it is and will be apparent to one skilled in the art that these specific details are not required in order to practice the present invention.

Figure 1:
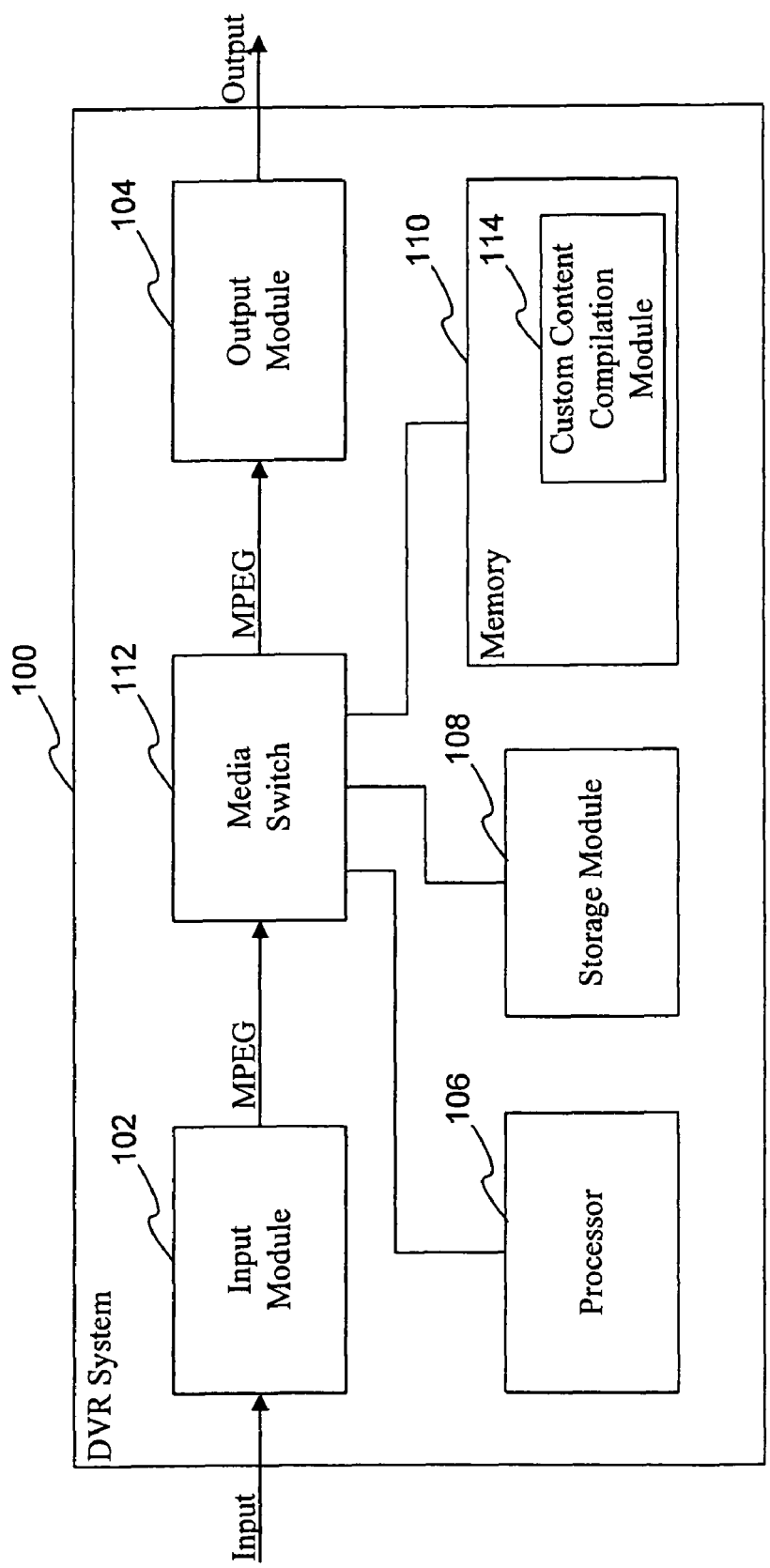
FIG. 1 is a block diagram illustrating an embodiment of a DVR system that includes a customized content compilation module in accordance with the present invention.

FIG. 1 is a block diagram illustrating an embodiment of a Digital Video Recorder (DVR) DVR system 100 for implementing one or more aspects of the invention.

Figure 2:
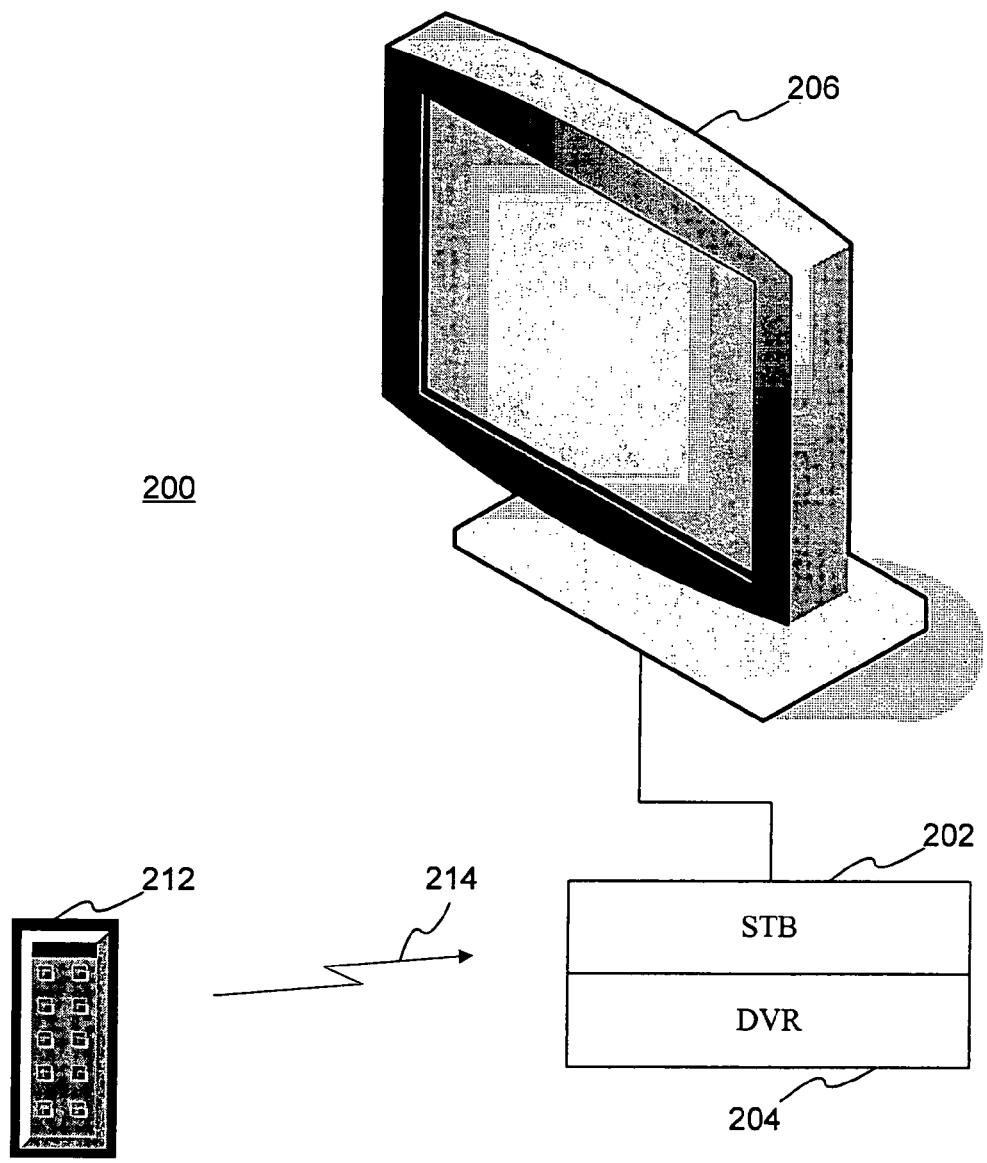
FIG. 2 is a schematic diagram illustrating an example of a system in accordance with the present invention.

Although a DVR system 100 is one example of a system implementing the invention, it is noted that other types of systems are equally applicable for such implementation. For example, FIG. 2 is a schematic diagram illustrating a system 200 that implements one or more aspects of the invention as a set-top box (STB) 202 which is separate from a DVR-type device. In this embodiment, the STB 202 is in communication with a DVR 204. The ensemble of the STB 202 and the DVR 204 collectively may be coupled to a display device, such as display 206. In one embodiment, the user may interact with the STB 202 by means of control instructions sent by pressing buttons on the wireless remote 212. The user may press the display button 208 to input a control instruction to the STB 202 to begin displaying information in a status bar at the bottom of the screen of the TV set 206, about the programming being displayed on display device 206. In another embodiment, the remote control 212 may include a power key, which is used to power the STB 204 on or off. It should equally be appreciated that a user may provide instructions to the STB 202 using any other known user input means. Moreover, wireless remote 212 may have more or fewer input options.

These other types of systems include but are not limited to any STB having stored content (whether in conjunction with a DVR or not), conventional computer systems having components for storing and reproducing stored content, display devices having internal facilities for storing and reproducing stored content (e.g., a television with internal receiver and storage), portable multimedia devices (e.g., an iPod™ or similar device for playing content), or portable communication devices (e.g., cellular phones).

Still referring to FIG. 1, the illustrated DVR system 100 includes an input module 102, a media switch 112, and an output module 104. The input module 102 accepts video input streams in one or more forms (e.g., National Television Standards Committee (NTSC), PAL, Digital Satellite System (DSS), Digital Broadcast System (DBS), Advanced Television Standards Committee (ATSC), etc.). DBS, DSS, and ATSC are based on standards called Moving Pictures Experts Group 2 (MPEG2) and MPEG2 Transport. MPEG2 Transport is a standard for formatting the digital data stream from the source transmitter so that a receiver can disassemble the input stream to find programs in the multiplexed signal.

The input module 102 may produce MPEG streams. An MPEG2 transport multiplex supports multiple programs in the same broadcast channel, with multiple video and audio feeds and private data. The input module 102 also accommodates tuning to particular channels, extracting particular programs, and feeding the same to the rest of the system. Analog video signals may be encoded into MPEG format using separate video and audio encoders. Information may be modulated into the Vertical Blanking Interval (VBI) of the analog video signal in a number of standard ways. For example, the North American Broadcast Teletext Standard (NABTS) may be used to modulate information onto lines 10 through 20 of an NTSC signal, while the FCC mandates the use of line 21 for Closed Caption (CC) and Extended Data Services (EDS). Such signals may be decoded by the input module 102 and passed to the other modules as if they were delivered via a MPEG2 private data channel.

The media switch 112 mediates between a microprocessor CPU 106, storage device 108 (e.g., a hard disk) and memory 110. The DVR system 100 also implements a cache, which may be found in memory 110. Input streams are converted to an MPEG stream and sent to the media switch 112. The media switch 112 buffers the MPEG stream into memory 110. If the user is watching real time broadcast content, the media switch 112 may send the stream to the output module 104, as well as simultaneously write it to the hard disk or storage device 108.

The output module 104 may take the MPEG streams as input and produces an analog video signal according to a particular standard (e.g., NTSC, PAL, or other video standard). In one embodiment, the output module 104 contains an MPEG decoder, on-screen display (OSD) generator, analog video encoder and audio logic. The OSD generator may be used to supply images which will be overlaid on top of the resulting analog video signal. Additionally, the output module 104 can modulate information supplied by the program logic onto the VBI of the output signal in a number of standard formats, including NABTS, CC, and EDS.

The user may input control instructions for displaying such programming information via button a remote control device, for example. It should equally be appreciated that a user may provide instructions to the DVR system 100 using any other known user input means.

The memory 110 also contains instructions that are used for various functions. These instructions may originally reside in the storage device 108 and may be uploaded during a boot up sequence or whenever the relevant functionality is a perceived requirement. For example, these instructions accommodate various typical DVR-related operations related to the management and reproduction of content, including the insertion of programming information directly into the MPEG data stream. The instructions also may accommodate various guide management and related functions, including the generation and management of digital chapter marks, also referred to as digital marks, in connection with aspects of the present invention, and the generation of thumbnail images including those used in connection with digital marks.

The instructions include those for providing a custom content compilation module 114 according to one or more aspects of the present invention. The custom content compilation module 114 is preferably software, but also may be provided as hardware or firmware, or any combination of software, firmware and hardware. According to one aspect, the custom content compilation module 114 provides interfaces and corresponding management of information to allow a user to apply digital marks to program segments, to maintain an association of digital marks as being within a content compilation sequence, and to facilitate a custom content reproduction (e.g., video playback) mode that sequentially outputs marked segments according to the content compilation sequence.

The user is thus allowed to create a "virtual program" by browsing through content and marking multiple pieces of such content using digital marks. For example, if the user has engaged the DVR system 100 to store multiple episodes of the program "Seinfeld", the user can navigate among that content and create a customized "Best of Seinfeld" program by creating digital chapter marks for segments within various episodes. The custom content compilation module 114 maintains these digital chapter marks for the virtual program (the content compilation sequence), and plays them back in the appropriate order as specified by the user.

According to another aspect, the custom content compilation module 114 allows the management of digital chapter marks in conjunction with provision of a "virtual album" wherein the compilation comprises recorded content of various media types. For example, the album may contain still images, video clips and audio clips. It is believed that this aspect may be useful for the management of user-customized content, such as photographs, video, and audio corresponding to a family vacation that is stored on the DVR (or, perhaps, on the storage device of a personal computer).

According to still another aspect, the custom content compilation module 114 communicates with a preference engine and/or user profile information of the DVR system 100 and uses that information to automatically generate virtual programs that contain all of the content that the identified user(s) would most likely watch. These virtual programs may also be categorized into general areas such as news, sports, etc., and may be preferentially displayed (or retained) as available based upon date and time information. For example, a given virtual program may be perceived as more desirable at a particular time of day. Since the custom content compilation module 114 generates these virtual programs automatically and suggests them to user(s), the custom content compilation module 114 may also automatically delete stale virtual programs according to some preferred schedule. The latter feature may be engaged unilaterally by the custom content compilation module 114, or in conjunction with other DVR system 110 modules that manage the retention of programs.

As another alternative, the digital marks are to facilitate editing out sections of recorded content. The user similarly marks the content, but designates the segment as being excluded during playback. This causes the segment to be skipped during a playback of the content. According to this alternative, the user may edit out only undesired segments (e.g., undesired advertisements or portions of a program) in a customized fashion.

Figure 3:
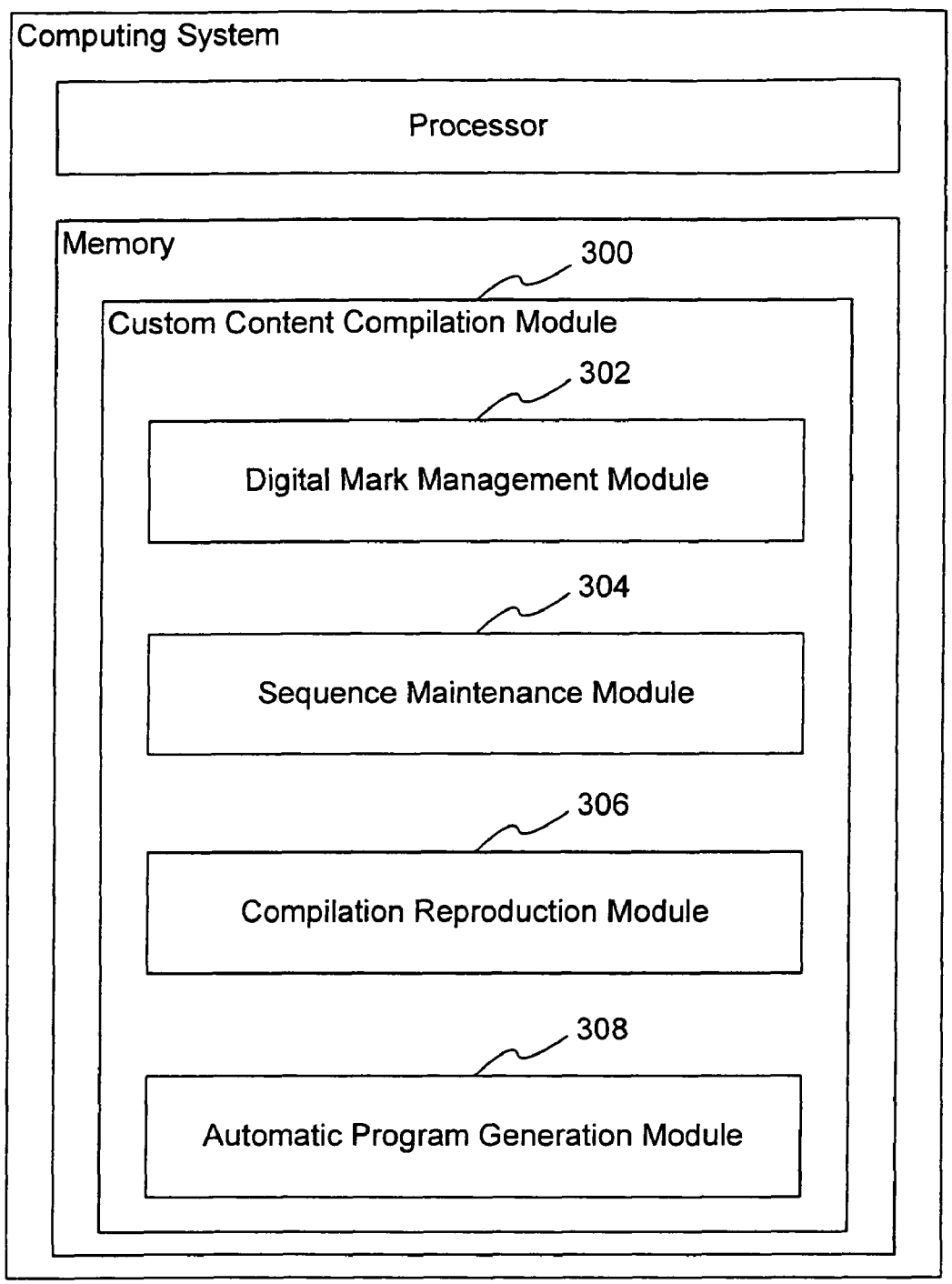
FIG. 3 is a block diagram illustrating an example of a customized content compilation module in detail, in accordance with the present invention.

FIG. 3 is a block diagram illustrating an embodiment of a custom content compilation module 300. As described above, the custom content compilation module 300 is preferably software but may be variously embodied. Also, the custom compilation module 300 may reside within various systems, as noted, including but not limited to a DVR system.

The custom compilation module 300 includes a digital mark management (DMM) module 302, a sequence maintenance module 304, a compilation reproduction module 306, and an automatic program generation module 308.

Although one modular breakdown of the custom content compilation system 300 is illustrated, it should be understood that the described functionality may also be provided using greater, fewer, or differently named sub-modules.

The DMM module 302 allows the definition of digital marks by the user, and communicates with the sequence maintenance module 304 with regard to updates regarding the same. To the extent necessary, the DMM module 302 also communicates with other DVR system 100 modules that provide conventional content maintenance and guide management functions. For example, the DMM module 302 may retrieve identification of previously stored content, the location of that content, as well as metadata related to the content. This information is variously displayed for the user to assist in the marking process. The DMM module 302 is configured to receive indications of digital marks that locate respective segments within program content, such as stored broadcast program content. Preferably, these segments (at least some) constitute less than the entirety of the program content to which they are applicable. That is, the segment may be a scene or other portion found within a stored television program. In this fashion, first, second, third, etc. digital marks respectively locate segments in various programs.

Preferably, the indication of digital marks includes an identification of the respective start and end points of their respective segments. Thus, a given "digital mark" comprises both start and end points. These points may be defined based upon respective time offsets within the corresponding program. Digital marks that define segments may also have start and end points that differ from those established by chapter marks defined by users for other purposes. The information for digital marks may also be collected while program content is being displayed (or, paused or otherwise manipulated using conventional commands such as rewind and fast forward).

The sequence maintenance module 304 communicates with the DMM module 302 and receives identification of the digital marks and related information. The sequence maintenance module 304 maintains a current digital mark sequence for one or more content compilation sequences. These content compilation sequences, as defined by the digital marks, provide content that may be referred to as a virtual program or virtual album. A given virtual program may be reviewed and manipulated by the user. For example, a user may decide that a particular segment would be more appealing in another location in the sequence. The sequence maintenance module 304 provides interfaces useful for accommodating management of the sequence. Of course, as a user makes changes to the sequence, or as new digital marks are introduced, the sequence maintenance module 304 updates the stored sequence to reflect the same.

Updates to previously-established content compilation sequences are also facilitated, by the sequence maintenance module 304 in conjunction with the DMM module 302. This may be done by receiving a command requesting an update to the content compilation sequence while program content is being output, interrupting output of the program content and receiving an indication of a new digital mark locating a segment within the current program content. The content compilation sequence is then updated to include the new digital mark.

The compilation reproduction module 306 provides a custom content compilation reproduction mode that sequentially outputs program content according to the content compilation sequence. A user selects a given virtual program for playback. This may be variously accomplished, such as through the conventional DVR system 100 menu or directly through the sequence maintenance module 304. The compilation reproduction module 306 may invoke the playback functionality of the DVR system 100 to sequentially play segments defined by the digital marks, as dictated by the content compilation sequence of the selected virtual program.

The DMM module 302 and/or sequence maintenance module 304 are also preferably configured to provide interfaces that ease the definition and management of digital marks. This entails graphically displaying the content compilation sequence, including a visual identification of the sequence of digital marks in the content compilation sequence. For example, a graphical bar type display may illustrate a sequence of digital marks.

The user may also provide customized descriptions for segments associated with digital marks. This may take many forms. For example, a user may want to associate text or voice that states "Here is my favorite scene in this series, ever!" in association with a given segment. Preferably, the custom description will play between segments in the sequence. This is just one example of a custom description, which may be various audio, video and text provided by the user. It may also be quips or scenes from another program. For example, a "Homer Simpson" quote may precede a given set of segments for a sitcom.

As described, according to another aspect, the custom content compilation module manages digital chapter marks in conjunction with provision of a "virtual album" containing still images, video clips and audio clips, preferably user-customized content such as photographs, video, and audio. The sub-modules function similarly, with the represented content being the user-customized content in lieu of broadcast program content or the like. This allows management of personal media.

The automatic program generation module 308 automatically generates custom virtual programs based upon perceived user preferences. The automatic generation module 308 may communicate with a preference engine provided by the DVR system 100, or may operate on profile information that is manually entered or managed by the user. This information is used to automatically generate virtual programs that contain all of the content that the identified user(s) would most likely watch. In one example, the programs are virtual programs generated from content that is received and stored by the DVR system 100. These virtual programs may also be categorized into general areas such as news, sports, etc., and may be preferentially displayed (or retained) as available based upon date and time information. For example, a given virtual program may be perceived as more desirable at a particular time of day. One or more virtual programs may be suggested for the user(s), along with other conventional suggestions, when the DVR system 100 is accessed. Automatic generation of the virtual programs can be based upon various techniques for determining whether a program is likely to be desirable to a user, including but not limited to investigation of keywords in title and program description data, analysis of viewing patterns, identification of programs favored by users with similar profiles, and expert based systems.

Virtual albums may also be automatically built and suggested based upon user profile information. The user may assist this process by associating metadata with entries that are loaded into the system. For example, the names of subjects within photos, or the particular portion of a vacation may be described. A given virtual album may comprise content perceived as belonging together based upon this metadata. Of course, as described, the user may manipulate sequences and add or remove content as desired.

Figure 4:
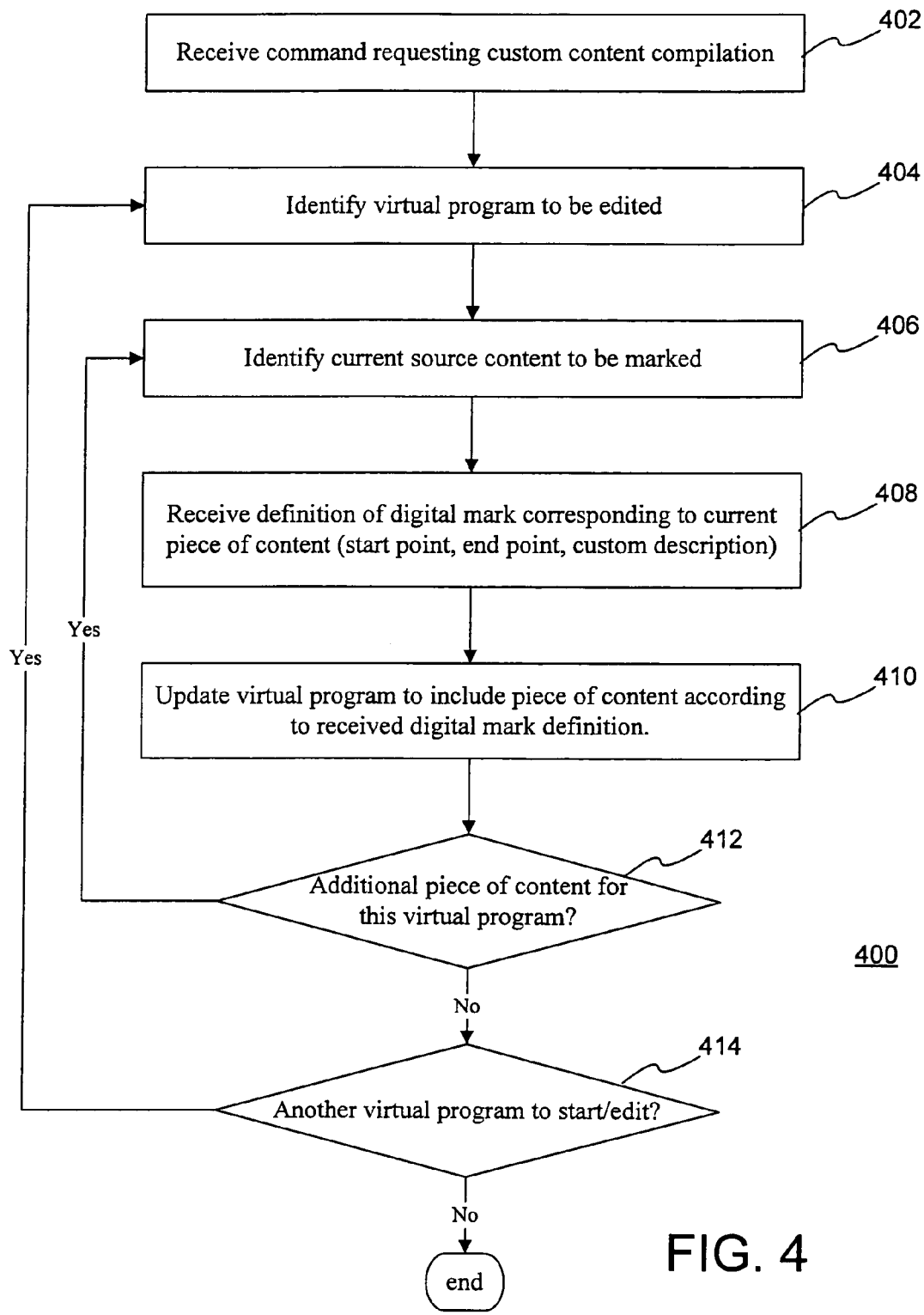
FIG. 4 is a flow diagram illustrating an example of providing custom content compilations in accordance with the present invention.

FIG. 4 is a flow diagram illustrating an example of a process 400 for providing custom content compilation using digital marks in accordance with the present invention. Specifically, FIG. 4 refers to a process 400 for associating segments defined by digital marks to a virtual program.

The process 400 initiates with receiving 402 a command requesting custom content compilation. As described, this may be through receipt of a command from a remote control, either through a dedicated button or through menu selection during a prescribed mode of operation. For example, a dedicated "custom content" button allows a user to immediately navigate to panels that allow the review and management of virtual programs. Alternatively, virtual programs may be shown as available content alongside regular program content.

A virtual program comprises a series of segments respectively defined by digital marks, with playback of the virtual program providing a seamless integration of those segments. The user may also establish and manage several different virtual programs. The process continues with identification 404 of the virtual program to be processed. This may be through a selection of a row corresponding to a previously established virtual program in a program guide. Alternatively, it may be a completely new virtual program.

The content in the virtual program may then be managed by adding, deleting, moving, and describing the segments that comprise the virtual channel. The process 400 commences with identification 406 of current source content to be marked using digital marks, which allow the segment in the source content to be identified and included in the virtual program. In one embodiment, this source content is preferably a stored program, such as a broadcast television program that is stored according to the DVR System functionality. In other embodiments, the source content may also comprise other content, including but not limited to a user's personal photographs, videos and audio.

The process 400 continues with receipt 408 of the definition of a digital mark corresponding to the current source content. The information defining the digital mark may include the start point and end point for a segment in the source content. For example, this segment may be a favorite scene in the source content. Descriptive information corresponding to the digital mark is also received. This information may include text that is entered using conventional commands, audio clips, or even video clips. Preferably, the descriptive information relates to the segment defined by the digital mark.

The current virtual program may then be updated 410 to include the piece of content defined by the digital mark. The digital mark may be manipulated, preferably using a graphical indication of the sequence of digital marks in the virtual program. This allows the segment to be placed wherever the user desires in the sequence of segments to be played back when the virtual program is later accessed for enjoyment. The initial placement may be at the end of the sequence for the current virtual program. Conventional user-interfacing may be used to accommodate editing of the sequence, including selection of a digital mark and cursor based operations to move the segment within a current virtual program.

The process 400 continues with additional identification 406 of source content and corresponding definition 408 of digital marks and updating 410 of the virtual program, when it is determined 412 that the user wants to add pieces of content to the current virtual program. Of course, the user may indicate a desire to create or edit more virtual programs, with processing determined 414 accordingly.

Figure 5:
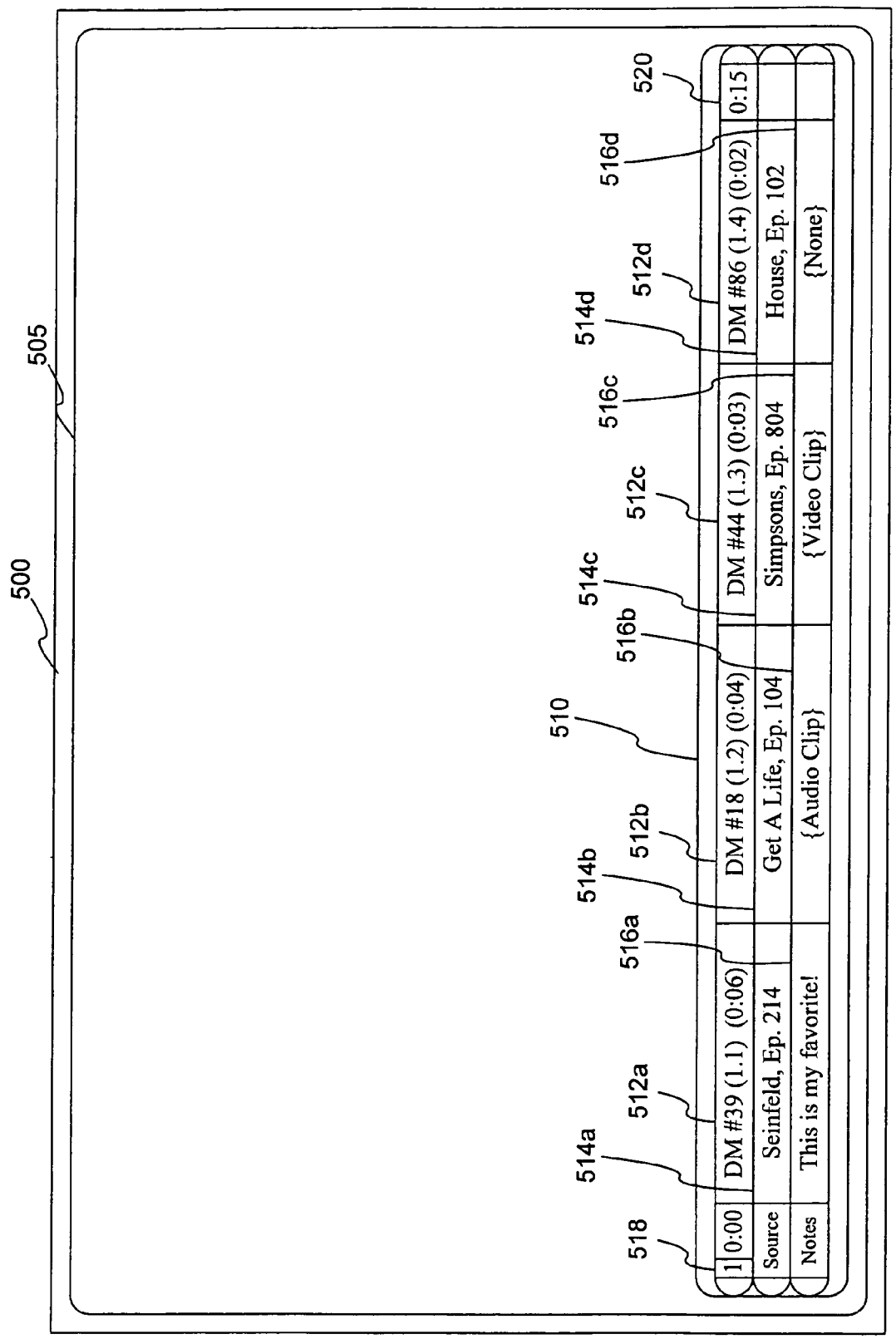
FIG. 5 is a display diagram illustrating an example of an interface for displaying and managing a virtual program having custom content in accordance with the present invention.

FIG. 5 is a display diagram illustrating an embodiment of a display device 500 and display screen 505, along with a virtual program information area 510. The display screen 505 displays video content concurrently with the presentation of the virtual program information area 510, or may also be configured to display a blank screen or other information. The virtual program information area 510 illustrates the sequence of segments for user review, navigation and manipulation. A first row of information includes a cell 518 that identifies the virtual program (e.g., "1") being reviewed, which may be any number, name or other identifying information. The row also identifies the sequence of segments in the virtual program. Cells 512*a-d* respectively identify the digital marks corresponding to the displayed sequence of segments. Within each of those cells 512*a-d*, a global number for the digital mark is illustrated (e.g., 39, 18, 44, 84). The numbering of the segments as part of the virtual program may also be provided, according to the currently configured sequence of segments in the virtual program. As indicated, the first number may correspond to the particular virtual program, and the second number to the numbering of the segments within the virtual program. Other information such as the duration of each individual segment is also provided. A virtual program duration indicator 524 indicates the total time of the virtual program.

In addition to the identification of the digital marks, a second row of information depicts respective identification of the source content corresponding to each digital mark, in another series of cells 514*a-d*. This source content may, for example, be identified according to the title of the program containing the segment defined by the digital mark. Although broadcast program content is the source content in one embodiment, the source content may alternatively come from other sources, including custom content that is loaded into the system by the user.

Still another row of information in the virtual program information area 510 includes descriptive information for each segment, again within cells 516*a-d* respectively corresponding to the segments. As a shorthand, the descriptive information may be referred to as "notes". The descriptive information is preferably customizable by the user, and may include text, audio and/or video information that the user wishes to associate with the segment. The text information may be entered using conventional remote control operations, such as through provision of a keyboard overlay on the screen from which selection of alphanumeric characters is made. Of course, in some embodiments an actual keyboard may be provided for input as well. Audio clips may be entered through a microphone, or may be previously uploaded clips that are selected for association with the segment.

The virtual program information area 510 is configured to allow user navigation among the cells 512a-d for the digital marks. Selection of a given digital mark prompts display of additional information corresponding to the digital mark, as well as segment editing and review.

Figure 6:
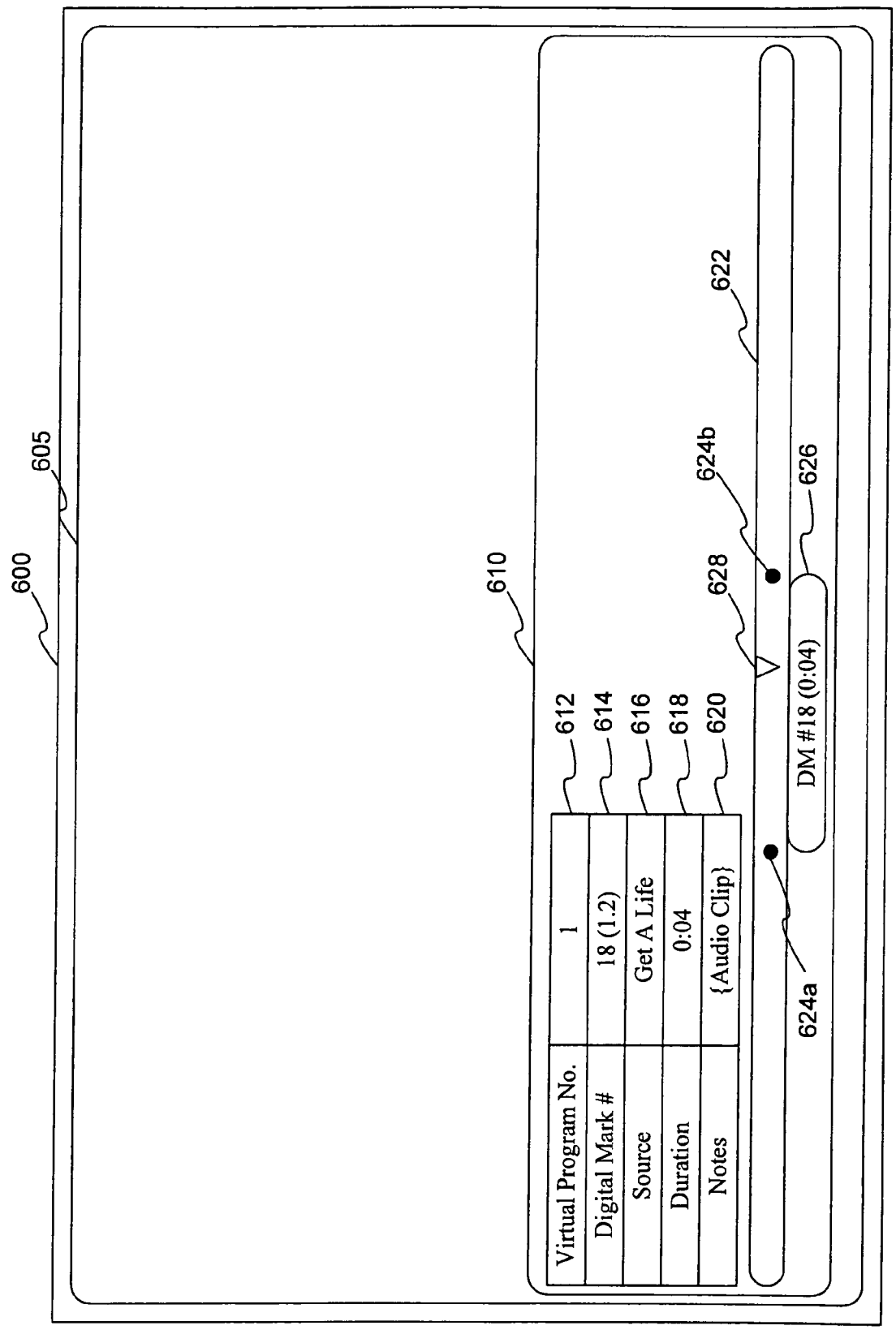
FIG. 6 is a display diagram illustrating an example of a digital mark information area.

FIG. 6 is a display diagram illustrating a digital mark information area 610 containing an example of the additional information corresponding to a digital mark, as well as facilities for editing the definition of the digital mark and corresponding segment. The digital mark information area 610 is illustrated with concurrent display of a display screen 605 of the display device 600.

The digital mark information area 610 is used to both convey and receive information corresponding to the definition of the digital mark (or marks). A table of information includes the virtual program identifier 612, digital mark number 614, source identification 616, duration 618 and "notes" identification 620.

The digital mark information area 610 also contains a program bar 622 that offers a depiction of the source content as well as the relative location of the segment within that source content. Specifically a start point 624a and end point 624b respectively correspond to the currently selected digital mark. A segment illustration bar 626 repeats an identification of the digital mark, such as through presentation of its identification number, and may offer additional information corresponding to the segment such as duration. Presentation of the segment in this fashion allows the user to easily edit the bounds of the segment within the source content. If the segment is determined to be too long, too short, or in the wrong location, the user may move either or both endpoints using cursor control and related inputs.

Video, including that from the segment, is concurrently played on the display screen 605. A play status bar 628 indicates the location of the video currently played on the screen 605. As with conventional DVR system functionality, the play status bar 628 may be moved, with the video playback updating accordingly. This allows the user to easily move to different locations within the program, so that the most desirable start and end points of a given segment may be easily identified.

Figure 7:
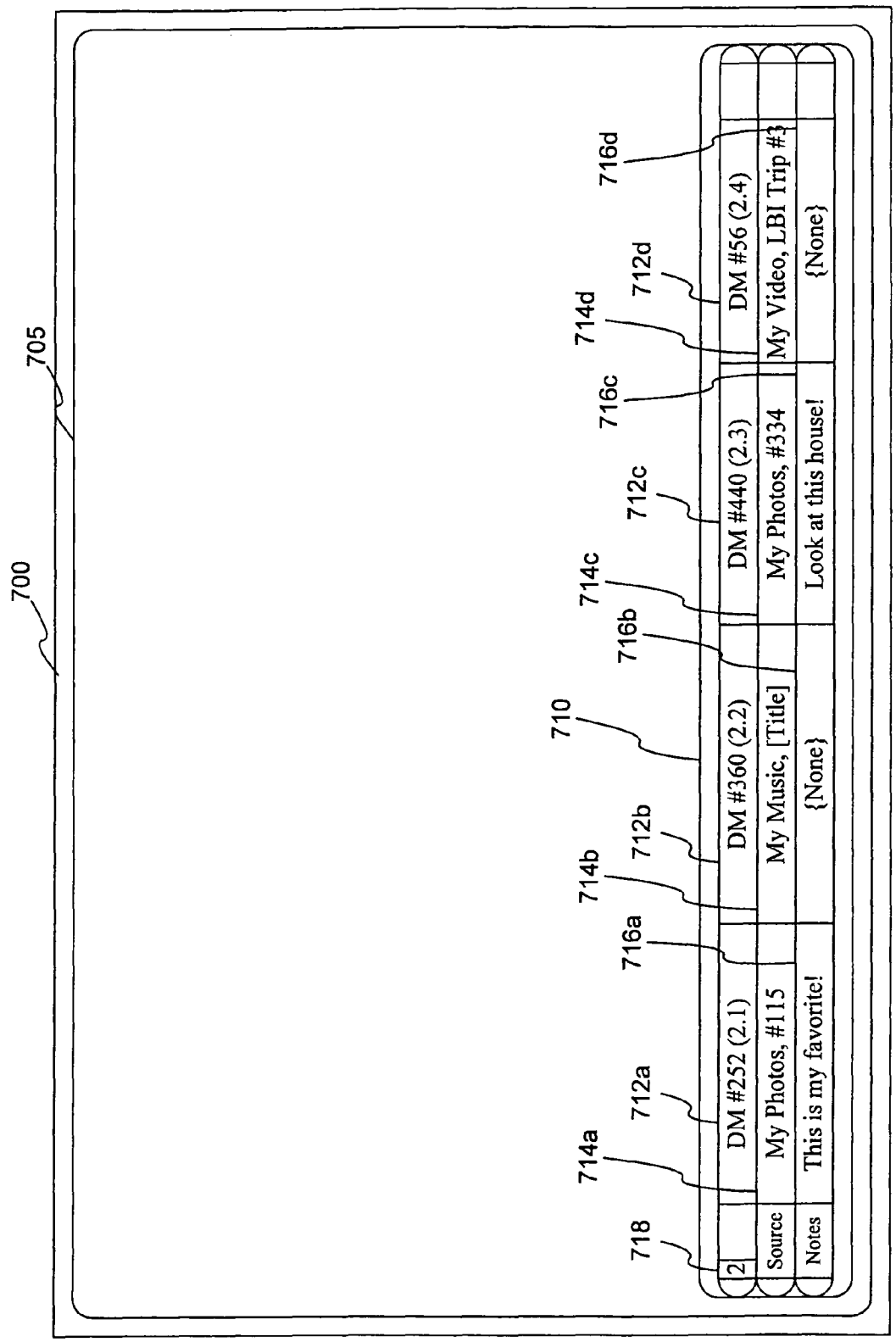
FIG. 7 is a display diagram illustrating a custom content compilation sequence using alternative content.

As described above, management of digital chapter marks may also be in conjunction with provision of a "virtual album" wherein the compilation comprises recorded content of various media types, such as still images, video clips and audio clips. This allows the management of user-customized content, such as photographs, video, and audio to be stored and enjoyed in a desired "program" and sequence. In this alternative, in lieu of program content being displayed as the source content associated with a content compilation, these other forms of content are noted as the source. FIG. 7 illustrates an example of a display device 700, display screen 705, and virtual program information area 710 according to this aspect. The cells 714a-d corresponding to segments indicate stored user photos, video, audio as the sources of content. The remaining elements of the virtual program information area 710, namely the virtual program identification 718, digital mark identification 712a-d, and descriptive information cells 714a-d are analogous to the functionality described in connection with FIG. 5 above.

The management of the digital marks and corresponding playback of content, including during a virtual program editing session, may be accommodated according to any number of alternatives, including those described in commonly owned, co-pending application Ser. No. 11/081,217, entitled Method and Apparatus for Navigating Video Content. For example, as described in that document, thumbnail images may be depicted in association with the segments corresponding to digital marks. A panel may comprise a sequence of thumbnails that correspond to the chapter marks, and a user may scroll through the thumbnails using directional navigation and related commands to manipulate the custom content compilation sequence represented by the thumbnails.

Thus embodiments of the present invention produce and provide custom content compilation. Although the present invention has been described in considerable detail with reference to certain embodiments thereof, the invention may be variously embodied without departing from the spirit or scope of the invention. Therefore, the following claims should not be limited to the description of the embodiments contained herein in any way.

The invention claimed is:

1. A method for providing a custom content compilation using digital marks, the method comprising:
receiving an indication of a first digital mark locating a first segment within a first program content that constitutes less than the entirety of the first program content;
receiving an indication of a second digital mark locating a second segment within a second program content that constitutes less than the entirety of the second program content;
associating the first and second digital marks as being within a content compilation sequence;
providing a custom content compilation reproduction mode that sequentially outputs program content according to the content compilation sequence;
receiving a command requesting an update to the content compilation sequence while a third program content is being output;
interrupting the output of the third program content and receiving an indication of a third digital mark locating a third segment within the third program content;
updating the content compilation sequence to include the third digital mark; and
graphically displaying the content compilation sequence, including a visual identification of a sequence of digital marks in the content compilation sequence with a descriptive information corresponding to each segment respectively located by digital marks in the content compilation sequence,
wherein the descriptive information includes text identifying a title of a program content, and a user-provided custom description for the segment.

2. The method of claim 1, wherein receiving the indication of the first, second and third digital marks includes an identification of the respective start and end points of the first, second and third segments.

3. The method of claim 1, wherein receiving the indication of the third digital mark includes a concurrent display of the third program content and user interfaces for defining the third segment.

4. The method of claim 3, wherein defining the third segment includes an identification of the start and end points of the third segment.

5. The method of claim 1, wherein the program content comprises video content stored in a storage device.

6. The method of claim 1, wherein the user-provided custom description is output between segments in the custom compilation sequence.

7. The method of claim 6, wherein the user-provided custom description contains one or more of audio, video and text provided by the user.

8. A method for providing a custom content compilation using digital marks, the method comprising:

receiving an indication of a first digital mark locating a first custom content having a first content type;

receiving an indication of a second digital mark locating a second custom content having a second content type that differs from the first content type;

associating the first and second digital marks as being within a content compilation sequence;

providing a custom content compilation reproduction mode that sequentially outputs content according to the content compilation sequence;

receiving a command requesting an update to the content compilation sequence while a third custom content is being output;

interrupting the output of the third custom content and receiving an indication of a third digital mark within the third custom content;

updating the content compilation sequence to include the third digital mark; and graphically displaying the content compilation sequence, including a visual identification of a sequence of digital marks in the content compilation sequence with a descriptive information corresponding to each segment respectively located by digital marks in the content compilation sequence, wherein the descriptive information includes text identifying a title of a program content, and a user-provided custom description for the segment.

9. The method of claim 8, wherein the different content types provided in the content compilation sequence comprise audio, video, and digital photographs.

10. A non-transitory computer-readable medium storing program code for providing a custom content compilation using digital marks that is executable by a computer to cause operations, comprising:

receiving an indication of a first digital mark locating a first segment within a first program content that constitutes less than the entirety of the first program content;

receiving an indication of a second digital mark locating a second segment within a second program content that constitutes less than the entirety of the second program content;

associating the first and second digital marks as being within a content compilation sequence;

providing a custom content compilation reproduction mode that sequentially outputs program content according to the content compilation sequence;

receiving a command requesting an update to the content compilation sequence while a third program content is being output;

interrupting the output of the third program content and receiving an indication of a third digital mark locating a third segment within the third program content;

updating the content compilation sequence to include the third digital mark; and graphically displaying the content compilation sequence, including a visual identification of a sequence of digital marks in the content compilation sequence with a descriptive information corresponding to each segment respectively located by digital marks in the content compilation sequence, wherein the descriptive information includes text identifying a title of a program content, and a user-provided custom description for the segment.

11. A computer apparatus for providing a custom content compilation using digital marks, comprising:

a processor; and a non-transitory memory, the non-transitory memory storing program code for providing a custom content compilation using digital marks that is executable by the processor to cause the computer apparatus to perform operations comprising:

receiving an indication of a first digital mark locating a first segment within a first program content that constitutes less than the entirety of the first program content;

receiving an indication of a second digital mark locating a second segment within a second program content that constitutes less than the entirety of the second program content;

associating the first and second digital marks as being within a content compilation sequence;

providing a custom content compilation reproduction mode that sequentially outputs program content according to the content compilation sequence;

receiving a command requesting an update to the content compilation sequence while a third program content is being output;

interrupting the output of the third program content and receiving an indication of a third digital mark locating a third segment within the third program content;

updating the content compilation sequence to include the third digital mark; and graphically displaying the content compilation sequence, including a visual identification of a sequence of digital marks in the content compilation sequence with a descriptive information corresponding to each segment respectively located by digital marks in the content compilation sequence, wherein the descriptive information includes text identifying a title of a program content, and a user-provided custom description for the segment.

12. The computer apparatus of claim 11, wherein receiving the indication of the first, second and third digital marks includes an identification of the respective start and end points of the first, second and third segments.

* * * * *